(12) United States Patent
Kimura et al.

(10) Patent No.: US 10,844,561 B2
(45) Date of Patent: Nov. 24, 2020

(54) VEHICLE

(71) Applicant: HONDA MOTOR CO., LTD., Tokyo (JP)

(72) Inventors: Yuta Kimura, Wako (JP); Yoshimasa Teruya, Wako (JP); Jun Fukano, Wako (JP); Tsutomu Mizoroke, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 256 days.

(21) Appl. No.: 15/983,350

(22) Filed: May 18, 2018

(65) Prior Publication Data

US 2019/0003136 A1 Jan. 3, 2019

(30) Foreign Application Priority Data

Jun. 30, 2017 (JP) .................................. 2017-129579

(51) Int. Cl.
| | | |
|---|---|---|
| *E01H 5/09* | (2006.01) | |
| *B60Q 1/24* | (2006.01) | |
| *B60Q 1/50* | (2006.01) | |
| *E01H 5/04* | (2006.01) | |
| *B60Q 1/04* | (2006.01) | |
| *F21S 41/40* | (2018.01) | |

(52) U.S. Cl.
CPC .............. *E01H 5/098* (2013.01); *B60Q 1/04* (2013.01); *B60Q 1/24* (2013.01); *B60Q 1/50* (2013.01); *E01H 5/04* (2013.01); *B60Q 2200/00* (2013.01); *B60Q 2400/50* (2013.01); *F21S 41/40* (2018.01)

(58) Field of Classification Search
CPC .. E01H 5/098; E01H 5/04; B60Q 1/04; B60Q 1/24; B60Q 1/50; B60Q 2200/00; B60Q 2400/50; F21S 41/40
See application file for complete search history.

(56) References Cited

U.S. PATENT DOCUMENTS

| | | | |
|---|---|---|---|
| 2007/0022636 A1* | 2/2007 | Wakitani | ................... E01H 5/04 37/245 |
| 2010/0192422 A1* | 8/2010 | Yamazaki | ................. E01H 5/04 37/257 |
| 2013/0243247 A1 | 9/2013 | Sakaue et al. | |

FOREIGN PATENT DOCUMENTS

| | | |
|---|---|---|
| JP | S58-026130 A | 2/1983 |
| JP | H08-044428 A | 2/1996 |
| JP | 2002-328022 A | 11/2002 |
| JP | 2005-264432 A | 9/2005 |
| JP | 2015-155270 | 8/2015 |

OTHER PUBLICATIONS

European Search Report dated Nov. 9, 2018, 6 pages.
Japanese Office Action with English translation dated Jan. 22, 2019, 10 pages.

* cited by examiner

*Primary Examiner* — Jamie L McGowan
(74) *Attorney, Agent, or Firm* — Rankin, Hill & Clark LLP

(57) ABSTRACT

A burden on an operation of an operator is reduced. A working machine includes a grid light that projects a grid light of a grid-shaped pattern, and a control unit that control the vehicle in accordance with deformation of the pattern of the grid light according to a shape of a projection spot.

8 Claims, 13 Drawing Sheets

VEHICLE

INCORPORATION BY REFERENCE

The present application claims priority under 35 U.S.C. § 119 to Japanese Patent Application No. 2017-129579 filed on Jun. 30, 2017. The content of the application is incorporated herein by reference in its entirety.

BACKGROUND OF THE INVENTION

Field of the Invention

The present invention relates to a vehicle.

Description of the Related Art

There has been conventionally proposed an art of irradiating a road surface with a grid-shaped laser light for an operator to perform an operation according to the shape of the road surface (for example, refer to Japanese Patent Laid-Open No. 2015-155270). In the art, based on the deformation of the grid-shaped laser light irradiated on the road surface, the operator visually judges concavities and convexities of the road surface, and carries out a driving operation in accordance with the concavities and the convexities of the road surface.

SUMMARY OF THE INVENTION

However, it is burdensome for an operator to perform a driving operation while visually confirming the deformation of the laser light.

The present invention has an object to provide a vehicle that can reduce a burden on an operation of an operator.

An aspect of the present invention is a vehicle including a pattern light projection unit that projects light of a predetermined pattern to a projection spot, a control unit that controls the vehicle in accordance with deformation of the predetermined pattern according to a shape of the projection spot.

According to the aspect of the present invention, even when an operator does not grasp a shape of the projection spot, the vehicle is controlled in accordance with the deformation of the predetermined pattern, that is, the shape of the projection spot, so that a burden on the operation of the operator can be reduced.

An aspect of the present invention is the above described vehicle which is a work vehicle including a work unit for executing predetermined work, wherein the pattern light projection unit projects the light of the predetermined pattern to a spot where the work unit works, and the control unit controls the work unit in accordance with the deformation of the pattern.

According to the aspect of the present invention, the work unit can be properly controlled in accordance with the shape of the spot of work of the work unit.

An aspect of the present invention is the above described vehicle further including a machine body that travels, wherein the work unit is provided in front of the machine body and performs snow-removal work, and the control unit controls the snow-removal work in accordance with the deformation of the pattern.

According to the aspect of the present invention, the appropriate snow-removal work can be executed in accordance with the shape of the spot where snow removal is performed.

An aspect of the present invention is the above described vehicle, wherein the work unit includes an auger that removes snow, and the control unit controls rotation of the auger in accordance with the deformation of the pattern.

According to the aspect of the present invention, rotation of the auger is properly controlled in accordance with a shape of accumulated snow in the spot where snow removal is performed.

An aspect of the present invention is the above described vehicle, wherein when the predetermined pattern deforms in accordance with a snow wall and a snow lump in the projection spot, the control unit increases a rotational frequency of the auger.

According to the aspect of the present invention, when a snow wall and a snow lump are present in the projection spot, the snow wall and the snow lump can be efficiently removed by the rotational frequency of the auger increasing.

An aspect of the present invention is the above described vehicle further including a raising and lowering mechanism that raises and lowers the auger, wherein the control unit controls the raising and lowering mechanism in accordance with the deformation of the pattern.

According to the aspect of the present invention, the auger is raised and lowered in accordance with the shape of the accumulated snow in the spot where snow removal is performed, whereby the auger can be adjusted to an appropriate height.

An aspect of the present invention is the above described vehicle, wherein when the predetermined pattern deforms in accordance with a transition border of a downward slope in the projection spot, the control unit lowers the auger by the raising and lowering mechanism, and when the predetermined pattern deforms in accordance with a transition border of an upward slope in the projection spot, the control unit raises the auger by the raising and lowering mechanism.

According to the aspect of the present invention, the auger can be adjusted to the appropriate height in accordance with the transition border of the downward slope and the transition border of the upward slope.

An aspect of the present invention is the above described vehicle further including a rolling mechanism that rolls the auger, wherein the control unit controls the rolling mechanism in accordance with the deformation of the pattern.

According to the aspect of the present invention, the rolling state of the auger can be brought into an appropriate state by control of the rolling mechanism according to the shape of the accumulated snow in the spot where snow removal is performed.

An aspect of the present invention is in the above described vehicle, wherein when the predetermined pattern deforms in accordance with a lateral inclination of the projection spot, the control unit rolls the auger in such a manner that a rolling state of the auger matches with an inclination of the lateral inclination.

According to the aspect of the present invention, even when the lateral inclination is present, the rolling state of the auger can be matched with the inclination of the lateral inclination.

An aspect of the present invention is the above described vehicle, wherein the control unit controls a travel speed in accordance with the deformation of the predetermined pattern.

According to the aspect of the present invention, the travel speed can be kept at an appropriate travel speed corresponding to the deformation of the predetermined pattern in the projection spot.

An aspect of the present invention is the above described vehicle, wherein when the predetermined pattern deforms in accordance with a snow wall and a snow lump in the projection spot, the control unit decreases the travel speed.

According to the aspect of the present invention, in the case where the snow wall and the snow lump are present in the projection spot, the work load exerted on the vehicle at the time of removing the snow wall and the snow lump can be reduced.

An aspect of the present invention is the above described vehicle, wherein when the predetermined pattern deforms in accordance with a level difference or a transition border of a downward slope in the projection spot, the control unit decreases the travel speed to a low speed.

According to the aspect of the present invention, when a level difference or a transition border of the downward slope is present in the projection spot, an impact received by the vehicle from the level difference or the transition border of the downward slope can be relieved.

An aspect of the present invention is the above described vehicle, wherein a light of the predetermined pattern is a visible light.

According to the aspect of the present invention, the operator can visually confirm the deformation of the predetermined pattern in the projection spot.

An aspect of the present invention is the above described vehicle, wherein the predetermined pattern is grid-shaped.

According to the aspect of the present invention, determination of the shape of the projection spot based on the deformation of the predetermined pattern in the projection spot is facilitated.

According to the aspect of the present invention, the burden on the operation of the operator is reduced.

DETAILED DESCRIPTION OF THE PREFERRED EMBODIMENT

Hereinafter, an embodiment of the present invention will be described with reference to the drawings.

Figure 1:
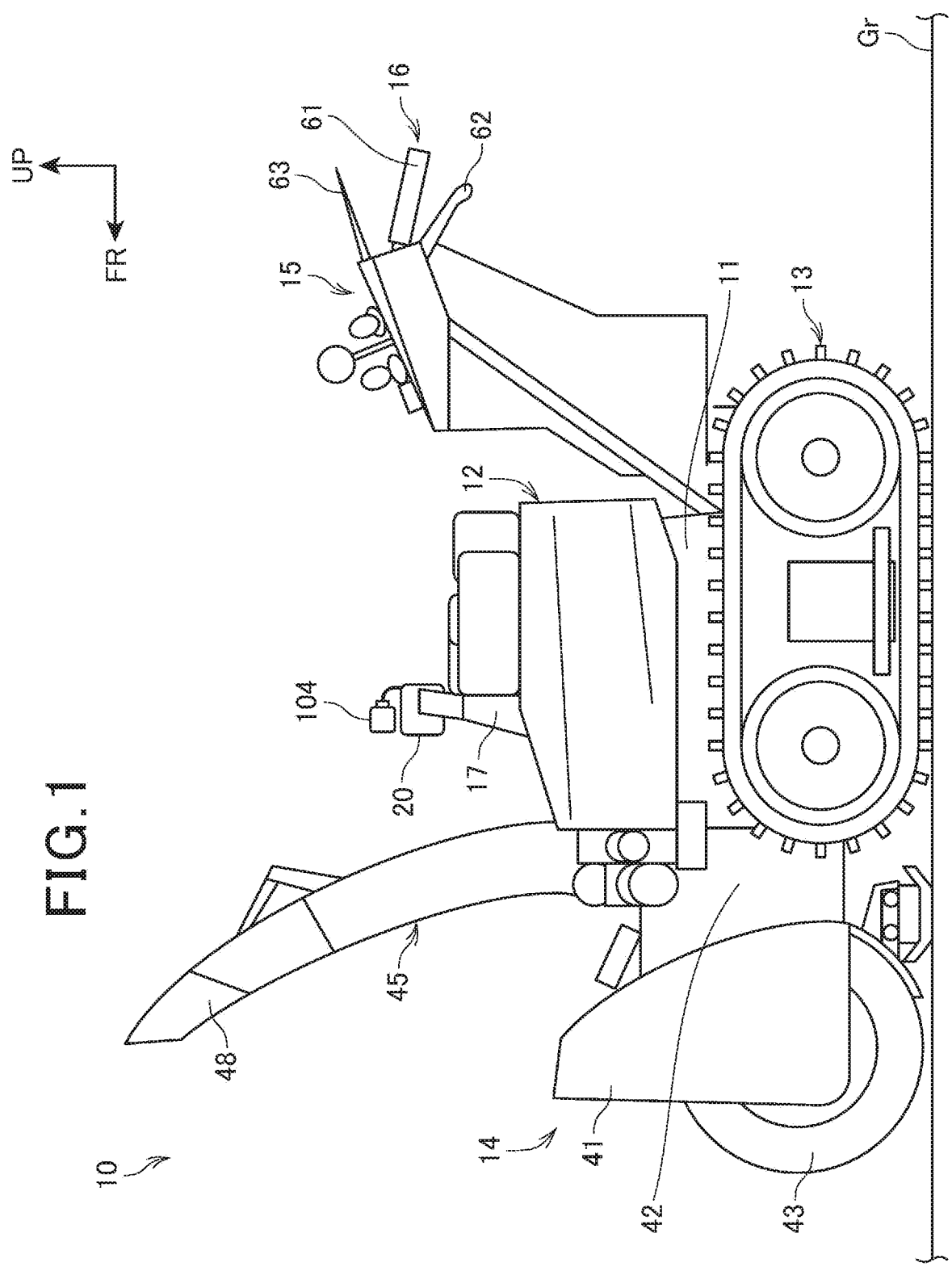
FIG. 1 is a side view of a working machine according to an embodiment of the present invention.
Figure 2:
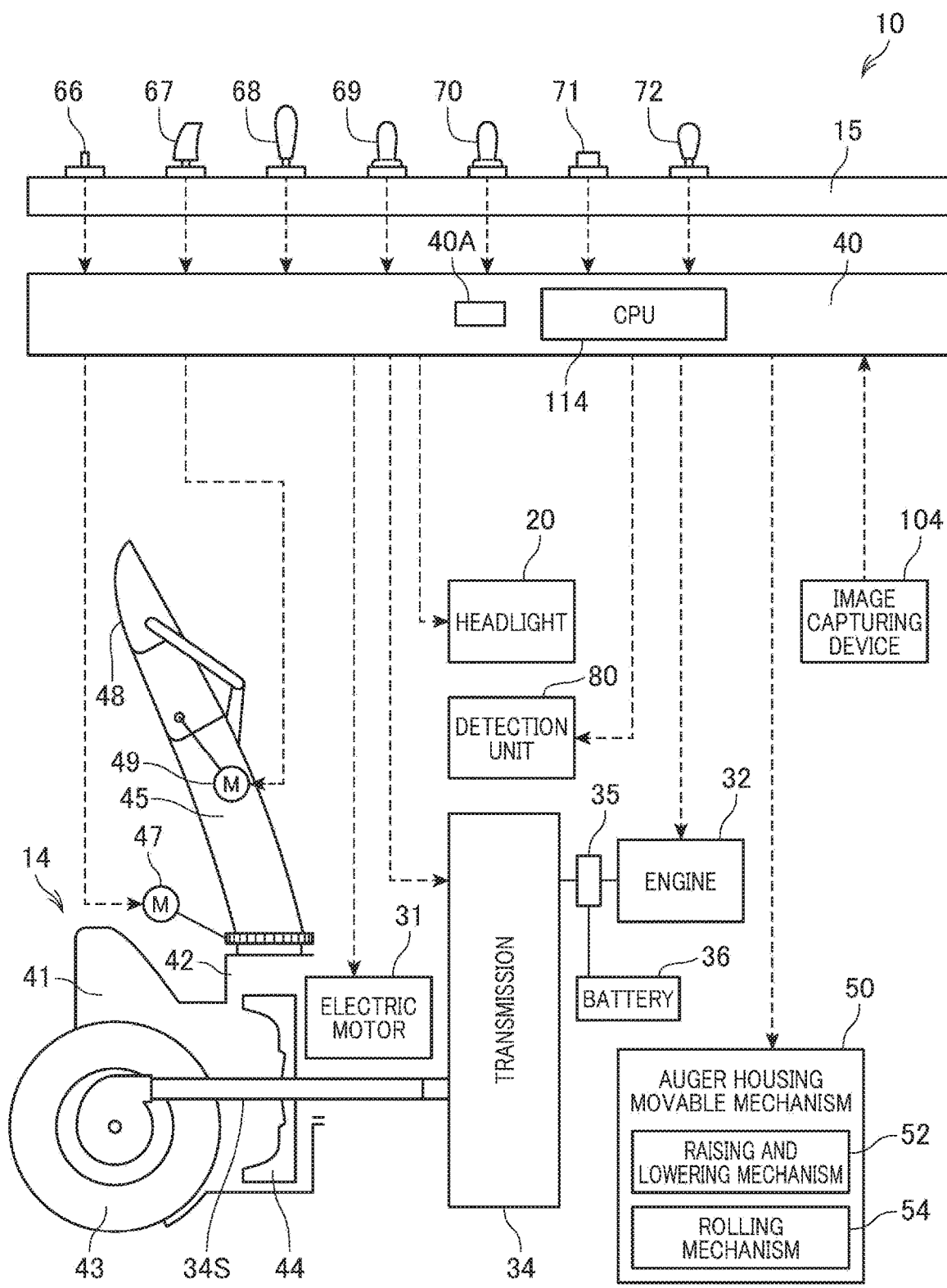
FIG. 2 is a diagram schematically illustrating a configuration of the working machine.

FIG. 1 is a side view of a working machine 10 according to the present embodiment. FIG. 2 is a diagram schematically illustrating a configuration of the working machine 10. Note that statements of respective directions such as a front, a rear, a left, a right and an up and a down are respective directions based on the working machine 10. In FIG. 1, a forward direction is denoted as reference sign FR, and an upward direction is denoted as reference sign UP.

As illustrated in FIG. 1, the working machine 10 is a self-propelled type snowplow (also referred to as a walking type snowplow) having a machine body 11 (a vehicle body frame 11) and equipping the machine body 11 with a power source 12, a travel device 13, a snow-removal work unit 14 (work unit) and an operation panel 15 (also referred to as an operation device). An operation handle 16 extends from a rear portion to a rear upper portion of the machine body 11. A worker (also referred to as a manipulator and an operator) who carries out snow-removal work grasps the operation handle 16 behind the working machine 10, and manipulates the working machine 10 while walking with the working machine 10.

The power source 12 is provided in a center in a front-rear direction of the working machine 10, and from a front upper portion of the power source 12, a pair of arms 17 are vertically provided by being spaced laterally. A headlight 20 that irradiates an illuminating light is supported at upper ends of the arms 17. The headlight 20 is disposed rearward of the snow-removal work unit 14 (an auger housing 41, a chute 45 and the like that will be described later) which is disposed at a front part of the vehicle body frame 11, and upward of the auger housing 41. Further, the headlight 20 is disposed at a vehicle width central position that is deviated in a left-right direction with respect to the chute 45.

Thereby, the illuminating light can be irradiated forward (forward of the auger housing 41) while avoiding the chute 45.

The power source 12 drives the travel device 13 and the snow-removal work unit 14, and has an electric motor 31 illustrated in FIG. 2, and an engine 32 illustrated in FIG. 2. The electric motor 31 drives the travel device 13 under control of a control unit 40 illustrated in FIG. 2. In the present configuration, the crawler type travel devices 13 are included by being spaced laterally, and the respective travel devices 13 are driven respectively by the different electric motors 31 via a speed reduction mechanism.

The engine 32 is an internal combustion engine, and drives the snow-removal work unit 14 via a transmission 34 under the control of the control unit 40. A power generator 35 is provided at a drive shaft of the engine 32. Electric power generated by the power generator 35 is supplied to electric components of the working machine 10, such as a battery 36, the electric motor 31 and the headlight 20. The travel device 13 may be configured to be driven by the engine 32.

As illustrated in FIGS. 1 and 2, the snow-removal work unit 14 includes then auger housing 41, and a blower housing 42 that is connected to a rear part of the auger housing 41. Further, the snow-removal work unit 14 includes an auger 43 provided in the auger housing 41, a blower 44 provided in the blower housing 42, and the chute 45 extended upward from the blower housing 42.

The auger housing 41 is a cover that covers an upper part, a rear part and both left and right sides of the auger 43, and covers the auger 43 in a state where a front part and a lower part of the auger 43 are exposed.

The auger 43 is rotationally driven by rotation of an output shaft 34S of the transmission 34 under the control of the control unit 40, and removes snow in front by crushing the snow. The blower 44 supplies snow crushed by the auger 43 to the chute 45, and shoots the snow to a location away from the working machine 10 by the chute 45. That is, the chute 45 functions as a show throwing section that throws the snow crushed by the auger 43 to the location away from the working machine 10.

The chute 45 is provided rotatably around an axis extending in a perpendicular direction to a ground Gr (corresponding to a travel surface on which the working machine 10 travels) on which the travel device 13 is grounded, and is rotationally driven by a chute drive motor 47. By the chute 45 rotating, a snow throwing direction is adjustable in an arbitrary direction of a forward, rearward, leftward and rightward directions.

A chute guide 48 is provided at an upper end portion of the chute 45. The chute guide 48 is mounted swingably up and down, and is capable of adjusting an angle in the vertical direction (that is, a snow throwing angle). The chute guide 48 has the snow throwing angle controlled by a guide drive motor 49.

As illustrated in FIG. 1, the working machine 10 crushes snow by the auger 43 at the front portion while traveling forward by the left and right travel devices 13, and can shoot the crushed snow to afar via the chute 45 by the blower 44.

Further, the working machine 10 includes an auger housing movable mechanism 50 that changes a posture of the auger housing 41 in which the auger 43 is held. The auger housing movable mechanism 50 includes a raising and lowering mechanism 52 that raises and lowers the auger housing 41 with respect to the machine body 11, and a rolling mechanism 54 that rolls the auger housing 41 with respect to the vehicle body frame 11. Rolling is an inclination (lateral swing) of the auger 43 with respect to horizontality. The auger housing movable mechanism 50 changes heights of the auger housing 41 and the auger 43, and changes the direction in the left-right direction.

The control unit 40 has a CPU (Central Processing Unit) 114 and a memory 40A (FIG. 2) that stores programs and various data, and controls respective units of the working machine 10 by executing, by the CPU, the programs stored in the memory 40A. The control unit 40 is disposed in a vicinity of the operation panel 15.

As illustrated in FIG. 1, the operation handles 16 each has a grip 61 grasped by a worker, and a left and right turn operation levers 62 respectively. Further, the left operation handle 16 has a travel preparation lever 63.

The control unit 40 allows drive of the travel device 13 and the snow-removal work unit 14 when the worker performs a predetermined operation (an operation of gripping the travel preparation lever 63 and pushing down the travel preparation lever 63 to the grip 61 side). Further, when the worker grips the left or right turn operation lever 62, the control unit 40 controls the travel device 13 to turn the working machine 10 to the direction of the gripped turn operation lever 62.

As illustrated in FIG. 2, the operation panel 15 includes a main switch 66, a throttle lever 67, a direction speed lever 68, an auger housing lever 69, a chute operation lever 70, an auger switch 71, a target work speed setting unit 72 and the like.

The main switch 66 is a manual operator that turns on an electric system, and starts the engine 32. The throttle lever 67 is a manual operator for controlling a rotational speed of the engine 32. The direction speed lever 68 is a manual operator for controlling rotation of the left and right travel devices 13.

The auger housing lever 69 is a manual operator that raises and lowers, and rolls the auger housing 41 in accordance with a snow surface by the auger housing movable mechanism 50 at a time of snow-removal work with the auger 43. The chute operation lever 70 is an operation member for changing orientations of the chute 45 and the chute guide 48 by the chute drive motor 47 and the guide drive motor 49.

The auger switch 71 is a manual operator that switches an electromagnetic clutch not illustrated that is provided in a power transmission route between the auger 43 and the engine 32, and enables power transmission when the auger switch 71 is on, and cuts off the power transmission when the auger switch 71 is off. That is, the control unit 40 drives the auger 43 and the blower 44 by the power of the engine 32 when an operation of lowering the travel preparation lever 63 to the grip 61 side and an operation of turning on the auger switch 71 are performed.

The target work speed setting unit 72 is a manual operator that sets a target work rotational speed of the snow-removal work unit 14. A snow throwing distance from the chute 45 is determined by a rotational speed of the blower 44, so that when the target work rotational speed of the snow-removal work unit 14 is set, the snow throwing distance from the chute 45 is set. That is, the target work speed setting unit 72 is also a manual operator (a snow throwing distance lever) that sets the snow throwing distance.

Further, the working machine 10 includes a detection unit 80 (FIG. 2) that detects information necessary for the control unit 40 to control respective parts of the working machine 10.

That is, the detection unit 80 includes a sensor for detecting the information on the respective parts of the working machine 10. In the present configuration, the information on the respective parts includes the rotational speed of the snow-removal work unit 14 (the rotational speed of the auger 43), the rotational speed of the engine 32, the height of the auger housing 41, the inclination angle of the auger housing 41 to the gravitational direction, a rolling position of the auger housing 41 and the like. As for these sensors, sensors of the conventional snowplow are applicable.

Figure 3:
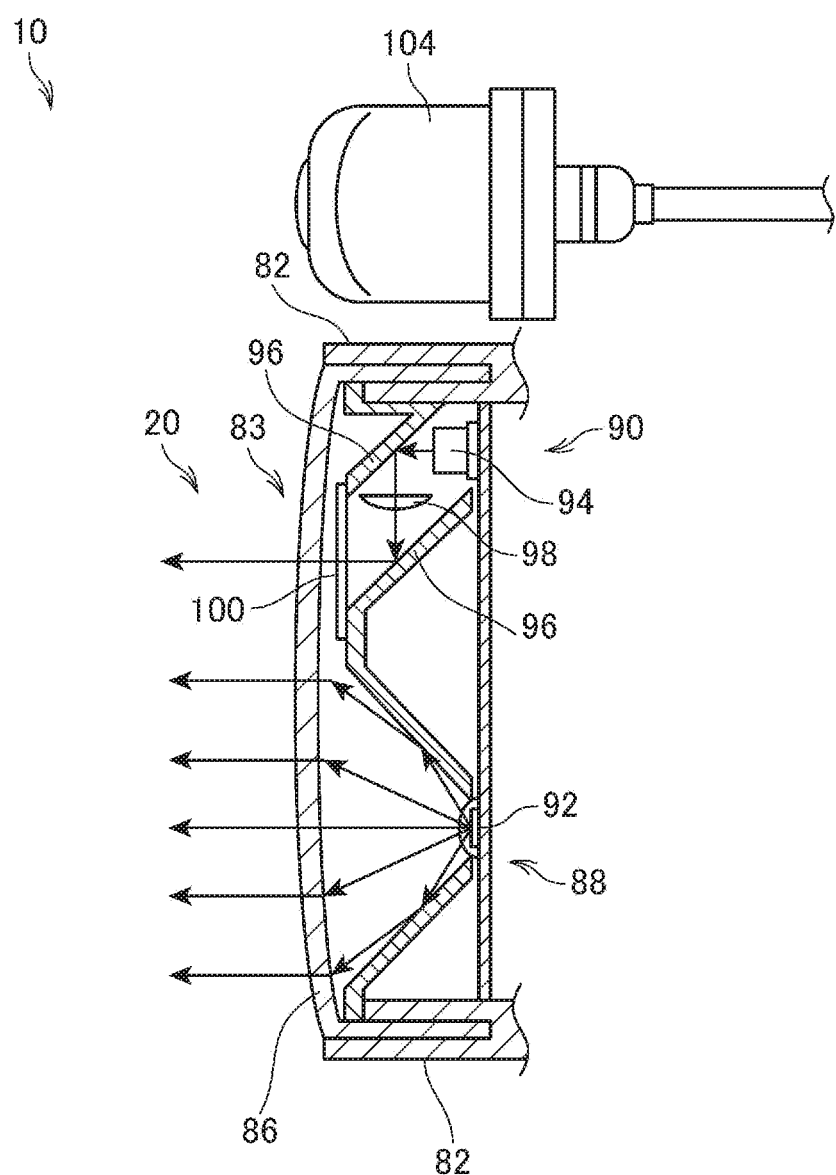
FIG. 3 is a view illustrating a configuration of a headlight.

FIG. 3 is a view illustrating a configuration of the headlight 20.

The headlight 20 includes a casing 82, and a transparent cover 86 provided in an emission opening 83 of the casing 82. The casing 82 includes an LED light 88 and a grid light 90. The LED light 88 includes an LED 92 that emits an illuminating light.

The grid light 90 projects a visible light in a grid-shaped pattern that is a tetragonal lattice (hereinafter, referred to as "a grid light") into a substantially circular range in front FR of the working machine 10 (hereinafter, referred to as "a projection spot P"), and includes a semiconductor laser 94, a reflector 96, a magnifying lens 98 and a lattice component 100. The semiconductor laser 94 is a light source of the grid light, and emits a laser light of a visible range wavelength. The reflector 96 reflects the laser light emitted from the semiconductor laser 94 toward the projection spot P. The magnifying lens 98 magnifies the laser light reflected by the reflector 96. The lattice component 100 converts the laser light passing through the magnifying lens 98 into the grid light.

The working machine 10 includes an image capturing device 104 above the headlight 20, the image capturing device 104 photographs a pattern 106 of the grid light in the projection spot P, and outputs photographing data to the control unit 40.

In the memory 40A of the working machine 10, correspondence of a shape of the projection spot P and a deformation tendency (or a characteristic) of the pattern in the projection spot P is stored. The control unit 40 determines the shape of the projection spot P based on the correspondence and the photographing data.

The shape of the projection spot P is a recessed and protruded shapes and an inclination of the projection surface (surface) of the projection spot P.

Figure 4:
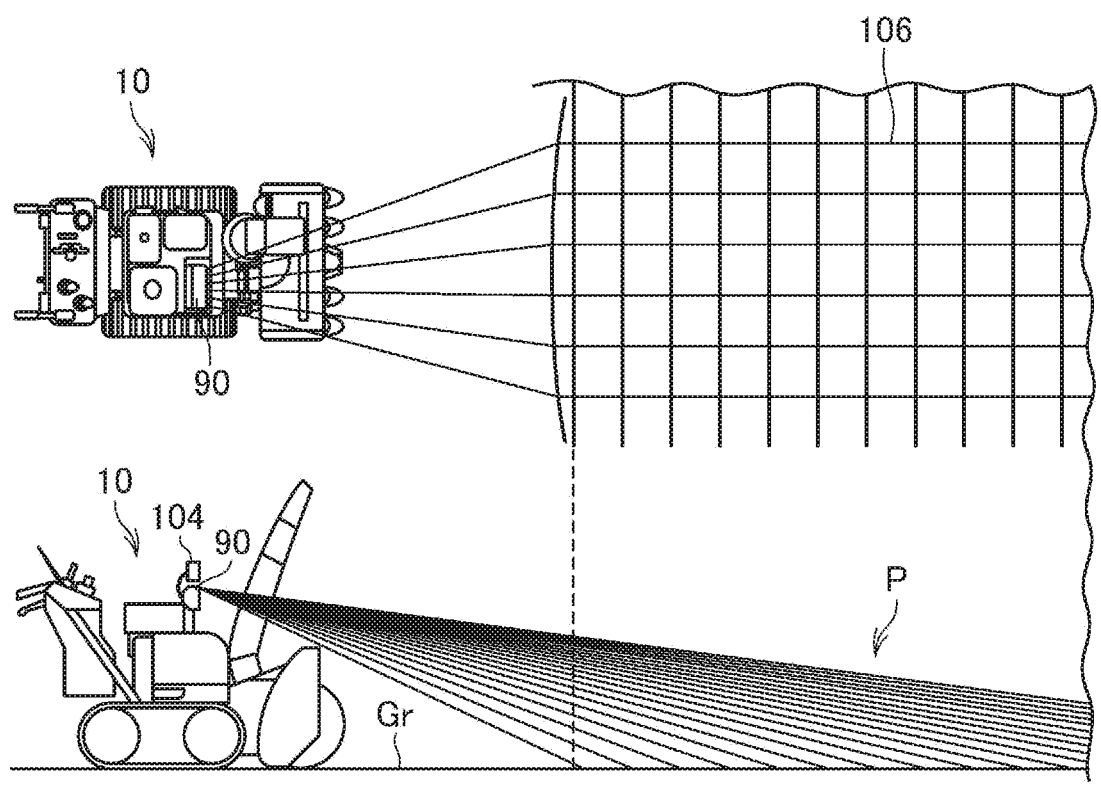
FIG. 4 is a diagram schematically illustrating a relationship between a shape of a projection spot and deformation of a pattern of a grid light, and illustrates a case where the grid light is projected to a ground without an inclination.
Figure 5:
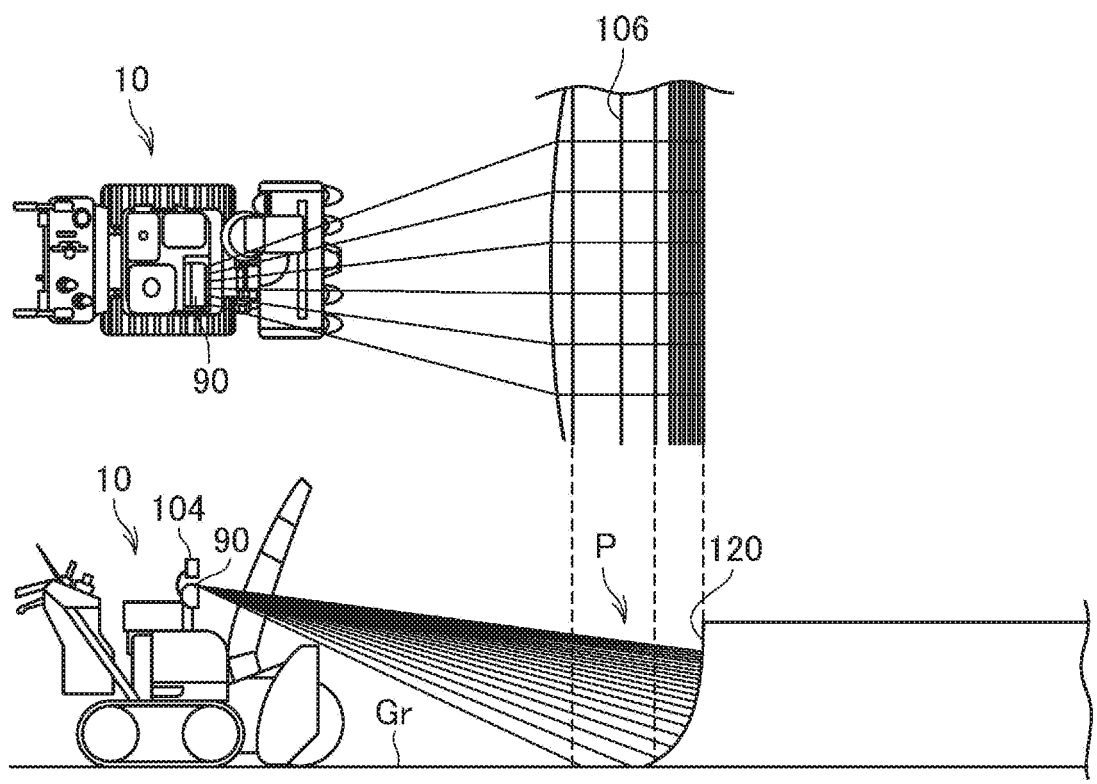
FIG. 5 is a diagram schematically illustrating the relationship between the shape of the projection spot and deformation of the pattern of the grid light, and illustrates a case where the grid light is projected to a wall surface of a snow wall.
Figure 6:
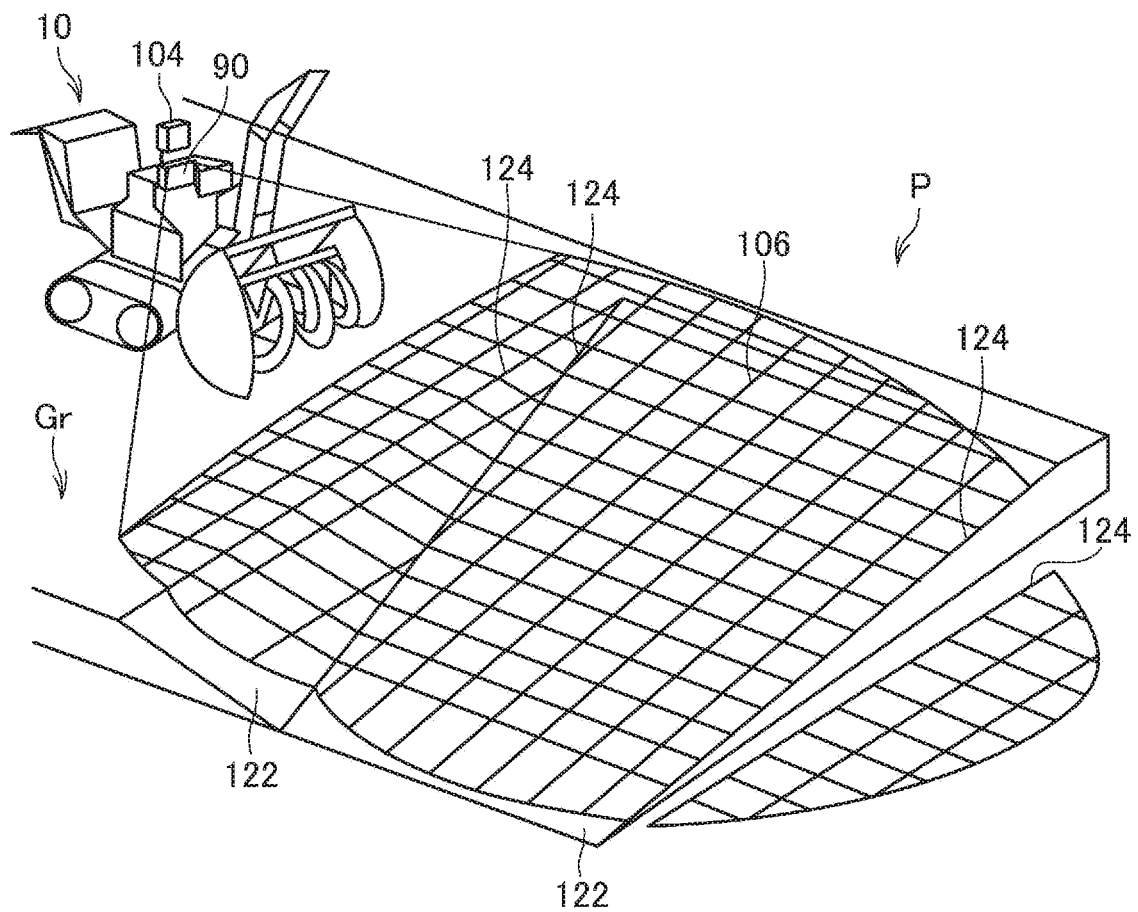
FIG. 6 is a diagram schematically illustrating the relationship between the shape of the projection spot and the deformation of the pattern of the grid light, and illustrates a case where the grid light is projected to a ground that is laterally inclined.
Figure 7:
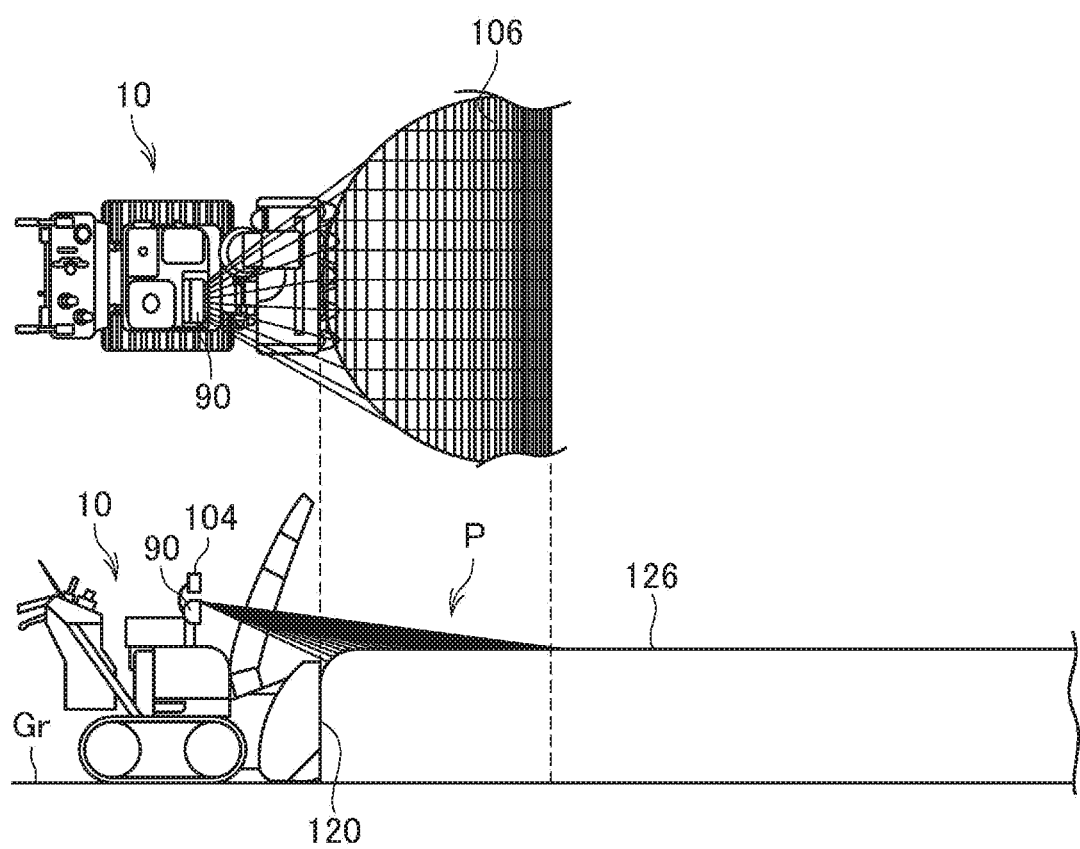
FIG. 7 is a diagram schematically illustrating the relationship between the shape of the projection spot and the deformation of the pattern of the grid light, and illustrates a case where the grid light is projected to a top surface of a snow wall.

FIGS. 4 to 7 are diagrams schematically illustrating a relationship between the shape of the projection spot P and deformation of the pattern 106 of the grid light. FIG. 4 illustrates a case where the grid light is projected to the ground Gr without an inclination. FIG. 5 illustrates a case where the grid light is projected to a wall surface of a snow wall 120. FIG. 6 illustrates a case where the grid light is projected to the ground Gr which has a lateral inclination 122. Further, FIG. 7 illustrates a case where the grid light is projected to a top surface 126 of the snow wall 120.

When the ground Gr has no inclination as illustrated in FIG. 4, the grid light draws the pattern 106 which is grid-shaped in plan view in the projection spot P. The pattern 106 becomes the pattern 106 in which respective grids are deformed into trapezoidal shapes, as seen from the image capturing device 104.

When the snow wall 120 is present as illustrated in FIG. 5, the pattern 106 in which grids are deformed in accordance with an inclination or the like of the wall surface of the snow wall 120 is drawn in the projection spot P.

When the ground Gr is a sloping road having the lateral inclination 122 as illustrated in FIG. 6, the pattern 106 in which grids are deformed in accordance with an inclination direction and an inclination angle of the inclination surface of the lateral inclination 122 is drawn in the projection spot P.

When the grid light is projected to the flat top surface 126 of the snow wall 120 as illustrated in FIG. 7, a distance to the projection spot P from the grid light 90 becomes short, so that as compared with the case where projection is made to the flat ground Gr without an inclination (FIG. 4), the pattern 106 in which the grids are dense in the projecting direction is drawn in the projection spot P.

As illustrated in FIGS. 5 and 6, when three-dimensional objects such as the snow wall 120, and the lateral inclination 122 are included in the projection spot P, a line 124 showing a boundary between the ground Gr and the three-dimensional objects is drawn in the projection spot P by deformation of the grids.

Figure 8:
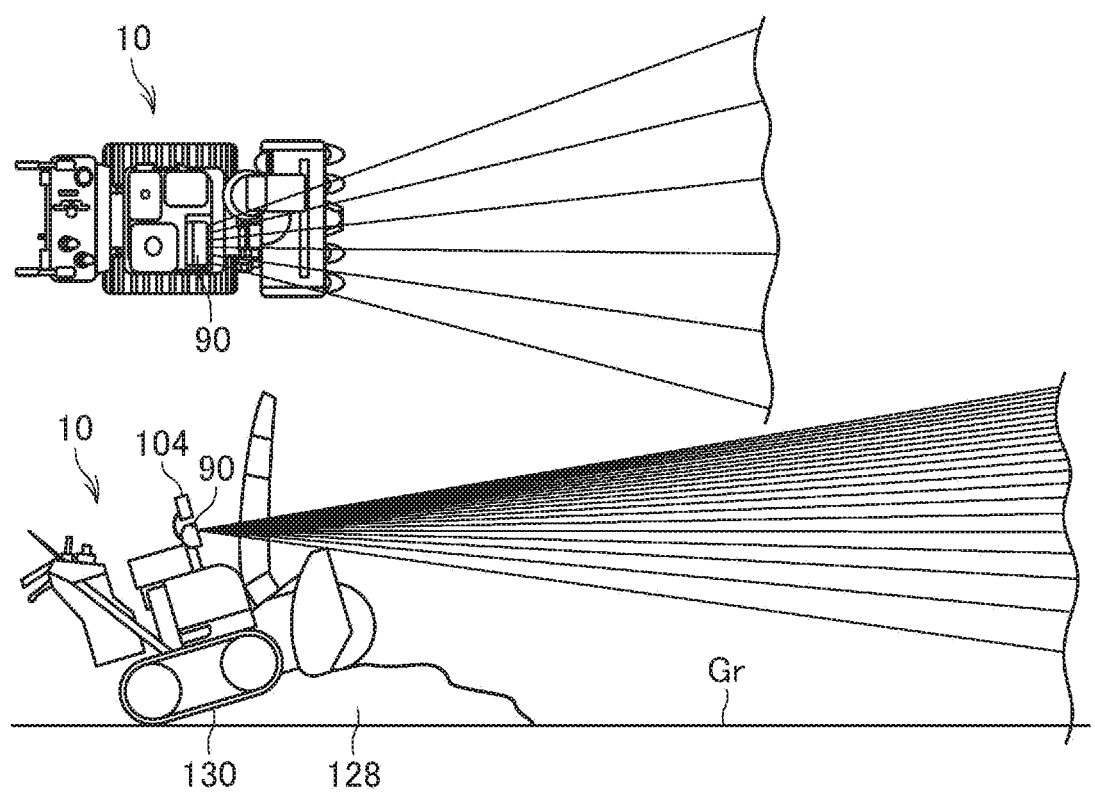
FIG. 8 is a diagram schematically illustrating the relationship between an inclination state of the working machine to the ground, and the deformation of the pattern of the grid light, and illustrates a state where the working machine is inclined upward with respect to the ground.
Figure 9:
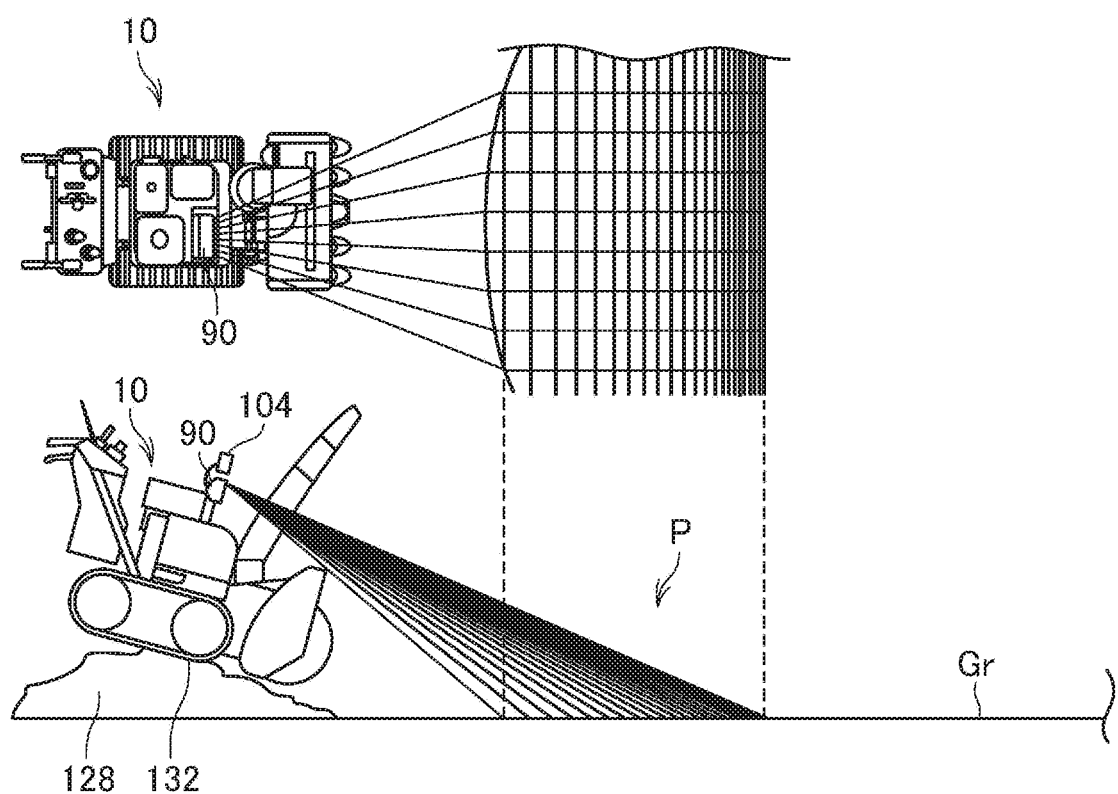
FIG. 9 is a diagram schematically illustrating the relationship between the inclination state of the working machine to the ground, and the deformation of the pattern of the grid light, and illustrates a state where the working machine is inclined downward with respect to the ground.

FIG. 8 and FIG. 9 are diagrams each schematically illustrating a relationship between the inclination state of the working machine 10 to the ground Gr, and deformation of the pattern 106 of the grid light. FIG. 8 illustrates a state where the working machine 10 inclines upward with respect to the ground Gr, and FIG. 9 shows a state where the working machine 10 inclines downward with respect to the ground Gr.

As illustrated in FIG. 8, when the working machine 10 rides on a snow lump 128 on the ground Gr, and the working machine 10 is in an upward posture with respect to the ground Gr, the grid light is not projected to the ground Gr, so that the pattern 106 of the grid light does not appear in the photographing data.

Further, as illustrated in FIG. 9, when the working machine 10 goes down the snow lump 128 on the ground Gr, and the working machine 10 is in a downward posture with respect to the ground Gr, the pattern 106 in which the grids are deformed in accordance with a relative inclination angle of the working machine 10 to the ground Gr is drawn in the projection spot P.

Next, an operation of the working machine 10 will be described.

Figure 10:
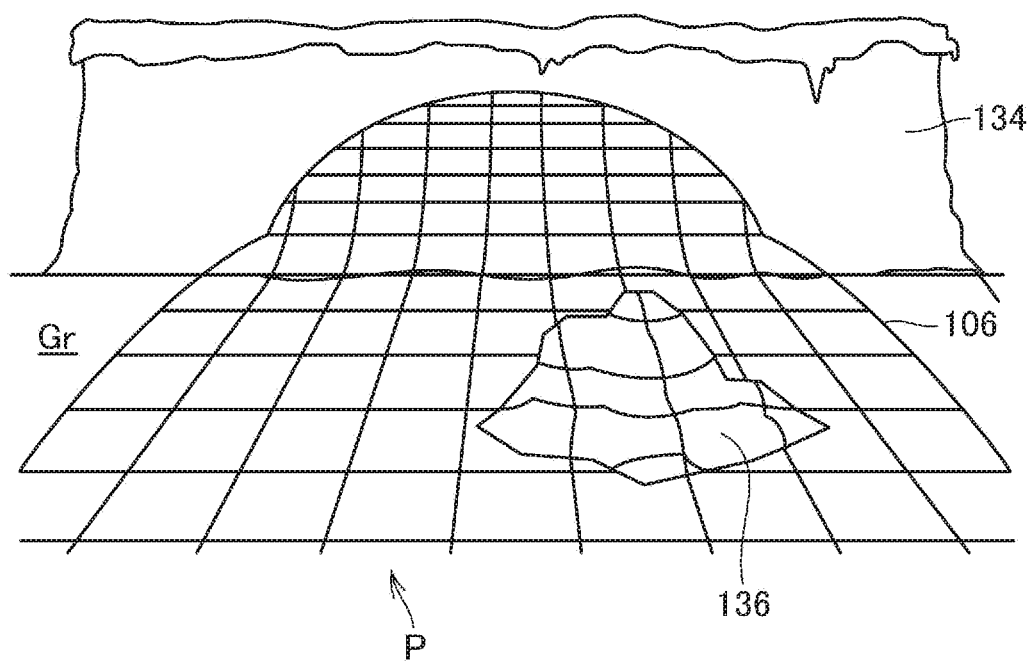
FIG. 10 is a schematic diagram illustrating a specific example of the projection spot of the grid light.

FIG. 10 is a schematic diagram illustrating a specific example of the projection spot P of the grid light.

In the operation example, as illustrated in FIG. 10, the case where the grid light is projected to a snow wall 134 and a snow lump 136 on the ground Gr will be described.

Figure 11:
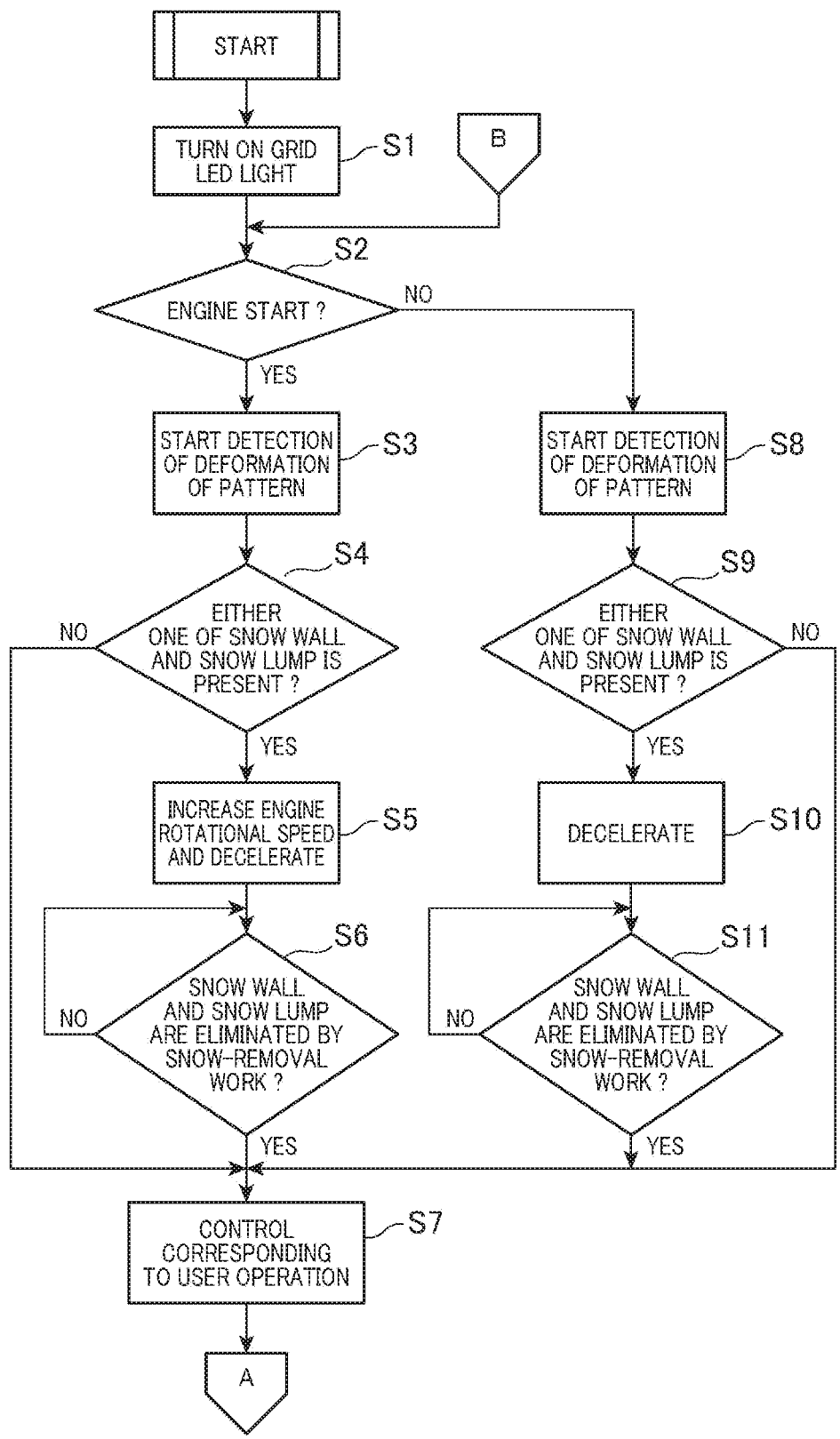
FIG. 11 is a flowchart illustrating an operation of the working machine.
Figure 12:
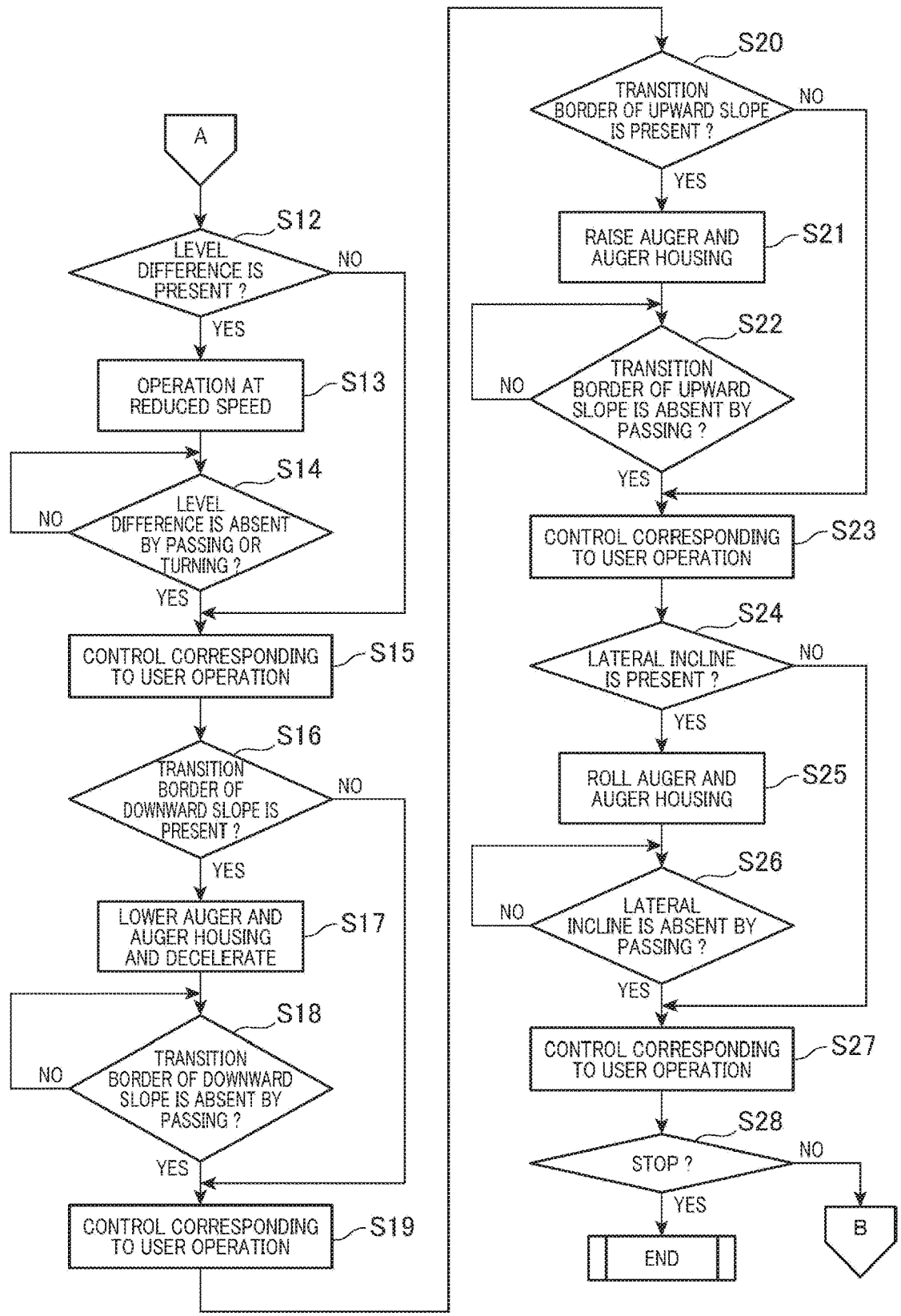
FIG. 12 is a flowchart illustrating a process continuing from A in FIG. 11.

FIGS. 11 and 12 are flowcharts illustrating an operation of the working machine 10, and FIG. 12 illustrates a process continuing from A in FIG. 11.

When the main switch 66 is operated by the worker, the control unit 40 turns on the LED light 88 and the grid light 90 (step S1), and determines whether or not the engine 32 which drives the snow-removal work unit 14 (the auger 43) is started up (step S2).

When the control unit 40 determines that the engine 32 starts up (step S2: YES), there is the possibility that snow-removal work by the snow-removal work unit 14 is started, so that the control unit 40 starts detection of deformation of the pattern 106 in the projection spot P in order to determine the shape of the projection spot P (step S3).

For example, when the control unit 40 determines that either a snow wall or a snow lump is present in the projection spot P in front FR of the working machine 10 based on the deformation of the pattern 106 (step S4: YES), the control unit 40 performs next processing.

That is, the control unit 40 increases the rotational frequency of the engine 32 to crush more snow, and decreases the travel speed of the working machine 10 to decrease a working load exerted on the working machine 10 at the time of removing the snow wall and the snow lump (step S5). Thereafter, the control unit 40 determines whether or not the snow wall and the snow lump are eliminated from the projection spot P by the snow removal work (step S6). The determination is repeated until both of the snow wall and the snow lump are eliminated by being removed by the snow-removal work, or the like, and when the snow wall and the snow lump are eliminated (step S6: YES), the worker executes control corresponding to the user operation performed by using the operation panel 15, for example (step S7).

When the engine 32 does not start in step S2 (step S2: NO), there is the possibility that the machine body 11 travels although the snow-removal work unit 14 (the auger 43) is not actuated. Thus, in order to determine the shape of the front FR of the machine body 11, the control unit 40 starts detection of the deformation of the pattern 106 in the projection spot P (step S8).

For example, when the control unit 40 determines that either of the snow wall and the snow lump is present in the projection spot P based on the deformation of the pattern 106 (step S9: YES), the control unit 40 decreases the travel speed of the working machine 10 to decrease the work load (step S10). Thereafter, the control unit 40 determines whether or not the snow wall and the snow lump are eliminated in the projection spot P (Step S11). The determination is repeated until the snow wall and the snow lump are eliminated by the working machine 10 passing through the snow wall and the snow lump, and when the snow wall and the snow lump are eliminated (step S11: YES), the control unit 40 advances the process to step S7.

Further, for example, when the control unit 40 determines that there is a level difference in the projection spot P based on the deformation of the pattern 106 (step S12: YES), the control unit 40 drives the working machine 10 at a reduced speed in order to reduce an impact which the working machine 10 receives from the level difference (step S13). Thereafter, the control unit 40 determines whether or not the level difference is eliminated in the projection spot P (step S14). The determination is repeatedly performed until the level difference becomes absent as a result of the working machine 10 riding over the level difference, turning to the direction in which the level difference is absent, or the like. When the level difference is absent (step S14: YES), and when no level difference is present from the beginning in the above described step S12 (step S12: NO), the control unit 40 controls the working machine 10 in accordance with a user operation (step S15).

For example, when the control unit 40 determines that a transition border of a downward slope is present in the projection spot P based on the deformation of the pattern 106 (step S16: YES), the control unit 40 executes next processing.

That is, the control unit 40 lowers the auger housing 41 (the auger 43) by the raising and lowering mechanism 52 to match the height of the auger 43 to the downward slope, and decelerates the working machine 10 to relieve the impact in the transition border of the downward slope (step S17). Thereafter, the control unit 40 determines whether or not the transition border of the downward slope is absent (step S18). The determination is repeated until the transition border of the downward slope becomes absent by the working machine 10 passing through the transition border of the downward slope, or the like, and when the transition border becomes absent (step S18: YES), the control unit 40 executes control corresponding to a user operation (step S19).

For example, when the control unit 40 determines that the transition border of an upward slope is present in the projection spot P based on the deformation of the pattern 106 (step S20: YES), the control unit 40 executes next processing.

That is, the control unit 40 raises the auger housing 41 (the auger 43) by the raising and lowering mechanism 52 in order to match the height of the auger 43 to the upward slope (step S21).

Subsequently, the control unit 40 determines whether or not the transition border of the upward slope is absent (step S22). The determination is repeated until the transition border of the upward slope becomes absent by the working machine 10 passing through the upward slope, or the like, and when the transition border is absent (step S22: YES), the control unit 40 executes control corresponding to a user operation (step S23)

Further, for example, when the control unit 40 determines that a lateral inclination is present in the projection spot P based on deformation of the pattern 106 (step S24: YES), the control unit 40 rolls the auger housing 41 by the rolling mechanism 54 to match the rolling state of the auger 43 with the inclination of the lateral inclination (step S25). Thereafter, the control unit 40 determines whether or not the lateral inclination is absent (step S26). The determination is repeated until the lateral inclination becomes absent by the working machine 10 passing through the lateral inclination, or the like, and when the lateral inclination is absent (step S26: YES), the control unit 40 executes control corresponding to a user operation (step S27).

The control unit 40 executes the process of the above described steps S2 to S26, until the main switch 66 that instructs to end the snow-removal work is operated (step S28: YES).

Figure 13:
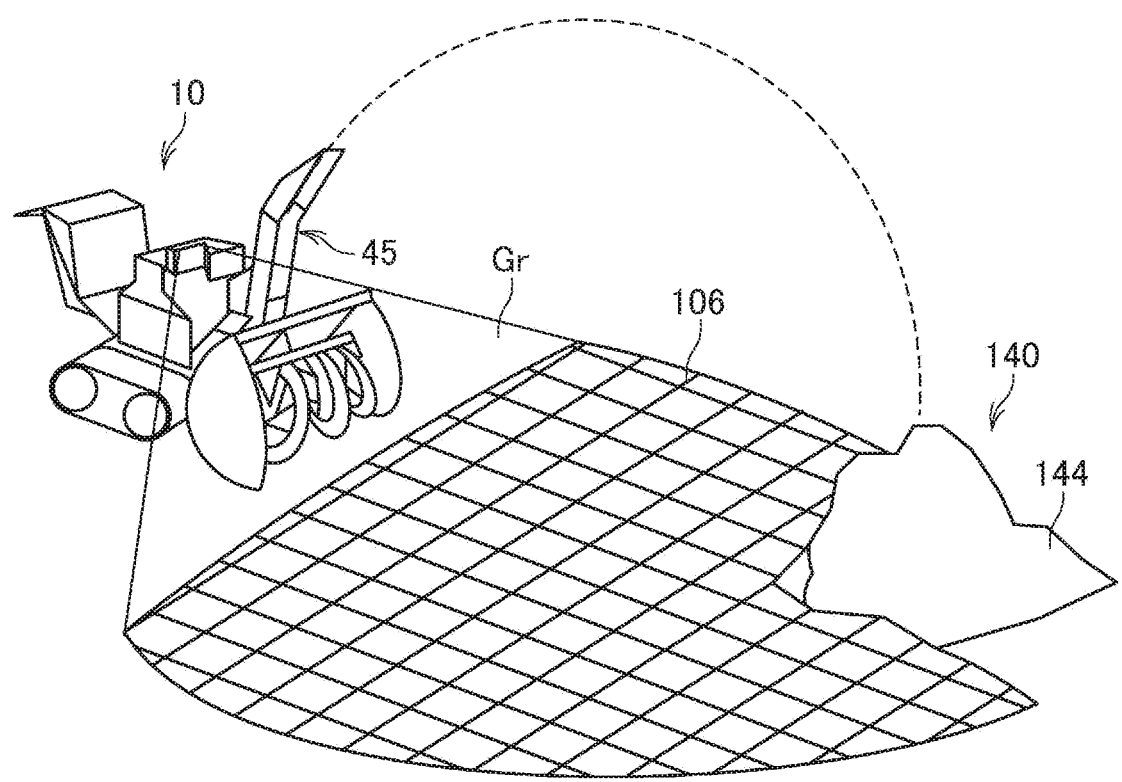
FIG. 13 is a diagram illustrating deformation of the pattern of the grid light by thrown snow by a chute.

In the snow-removal work, a snow lump 144 occurs to a thrown snow drop position 140 by the chute 45, as illustrated in FIG. 13. The snow lump 144 increases in height sequentially by snow throwing, and the pattern 106 of the grid light also deforms sequentially in accordance with the increase in height. Accordingly, the worker can grasp the thrown snow drop position 140 by finding a spot where the pattern 106 is sequentially changing, and can confirm whether snow can be thrown to a position intended by the worker.

According to the present embodiment, effects as follows are exhibited.

The working machine 10 of the present embodiment projects the grid light of the grid-shaped pattern 106 to the projection spot P, detects deformation of the pattern 106 of the grid light according to the shape of the projection spot P, and the control unit 40 executes control in accordance with the deformation.

Thereby, even when the operator does not grasp the shape of the projection spot P, control is executed in accordance with the deformation of the grid-shaped pattern 106, that is, the shape of the projection spot P, so that a burden on the operation of the driver can be reduced.

Further, in the working machine 10 of the present embodiment, the pattern of the light which is projected to the projection spot P is grid-shaped, so that determination of the shape of the projection spot P based on the deformation of the pattern of the grid light is facilitated.

The working machine 10 of the present embodiment projects the grid light to the spot where the snow-removal work unit 14 works, and the control unit 40 controls the snow-removal work unit 14 in accordance with the deformation of the pattern 106 of the grid light.

Thereby, the snow-removal work unit 14 can be properly controlled in accordance with the shape of the spot of a snow removal target.

The working machine 10 of the present embodiment controls the rotational frequency of the auger 43 in accordance with deformation of the pattern 106 of the grid light. Thereby, the rotational frequency can be properly controlled in accordance with the shape of accumulated snow in the projection spot P.

Further, the working machine 10 of the present embodiment increases the rotational frequency of the auger 43 when the pattern 106 deforms in accordance with the snow wall and the snow lump in the projection spot P. Thereby, when the snow wall and the snow lump are present in the projection spot P, the snow wall and the snow lump can be efficiently removed as a result that the rotational frequency of the auger 43 increases.

The working machine 10 of the present embodiment controls the raising and lowering mechanism 52 in accordance with deformation of the pattern 106 of the grid light. Thereby, the auger 43 can be controlled to an appropriate height in accordance with the shape of the projection spot P.

Further, when the pattern 106 deforms in accordance with the transition border of the downward slope in the projection spot P, the working machine 10 of the present embodiment lowers the auger 43 by the raising and lowering mechanism 52, and raises the auger 43 by the raising and lowering mechanism 52 when the pattern 106 deforms in accordance with the transition border of the upward slope in the projection spot P. Thereby, the auger 43 can be adjusted to an appropriate height in accordance with the transition border of the downward slope and the transition border of the upward slope.

The working machine 10 of the present embodiment rolls the auger 43 in accordance with deformation of the pattern 106 of the grid light. Thereby, the rolling state of the auger 43 can be brought into an appropriate state in accordance with the shape of the accumulated snow in the spot where snow removal is performed.

Further, when the pattern 106 deforms in accordance with the lateral inclination of the projection spot P, the working machine 10 of the present embodiment rolls the auger 43 so that the rolling state of the auger 43 corresponds to the inclination of the lateral inclination. Thereby, even when the lateral inclination is present, the rolling state of the auger 43 can be matched with the inclination of the lateral inclination.

The working machine 10 of the present embodiment controls a travel speed in accordance with the deformation of the pattern 106 of the grid light. Thereby, the travel speed can be properly controlled in accordance with the shape of the projection spot P.

Further, when the pattern 106 deforms in accordance with the snow wall and the snow lump in the projection spot P, the working machine 10 of the present embodiment decreases the travel speed. Thereby, when the snow wall and the snow lump are present in the projection spot P, the working load exerted on the working machine 10 at the time of removing the snow wall and the snow lump can be decreased.

Further, when the pattern 106 deforms in accordance with a level difference or the transition border of a downward slope in the projection spot P, the working machine 10 of the present embodiment decreases the travel speed to a low speed. Thereby, when the level difference or the transition border of the downward slope is present in the projection spot, the impact received by the working machine 10 from the level difference or the transition border of the downward slope can be relieved.

In the working machine 10 of the present embodiment, the grid light is a visible light, so that the worker can visually confirm deformation in the projection spot P of the grid light, and from the deformation, the worker can also grasp the shape of the projection spot P.

For example, when snow accumulates, the worker may be deluded that there is no inclination or level difference on the ground Gr, because the ground Gr is white. Even in this case, the worker watches deformation of the pattern 106, and thereby can easily grasp the inclination and the level difference in the projection spot P.

Note that the aforementioned embodiment is only the illustration of one mode of the present invention, and can be arbitrarily deformed and applied within the range without departing from the gist of the present invention.

In the aforementioned embodiment, the grid light 90 that projects the grid light is provided in the headlight 20, but may be provided separately from the headlight 20 without being limited to this. Further, an arbitrary method can be used in projection of the grid light.

Further, the pattern which is projected is not limited to the grid-shaped pattern, but an arbitrary pattern can be adopted if only the pattern is such that predetermined shapes (for example, rectangles or polygons) are regularly arranged.

Further, the grid light is not limited to laser light if only the grid light is a light capable of forming a pattern in the projection spot P. Further, the grid light is not limited to a visible light, but may be a light of another wavelength such as infrared rays, and ultraviolet rays, as long as the pattern is detectable by the detection device such as the image capturing device 104.

In the aforementioned embodiment, the snowplow may be of a walking type without being limited to a self-propelled type.

Further, the present invention can be applied to an arbitrary working machine such as a tiller that tills a field or a rice paddy, for example, without being limited to the snowplow.

REFERENCE SIGNS LIST

10 Working machine (vehicle, work vehicle)
11 Vehicle body frame (machine body)
13 Travel device
14 Snow-removal work unit (work unit)
15 Operation panel
16 Operation handle
20 Headlight
40 Control unit
41 Auger housing
43 Auger
50 Auger housing movable mechanism
52 Raising and lowering mechanism
54 Rolling mechanism
90 Grid light (pattern light projection unit)
104 PCU
106 Pattern
Gr Ground
P Projection spot

What is claimed is:

1. A vehicle that is a working machine having a machine body that travels and an auger provided in front of the machine body and performs snow-removal work, comprising:
   a light that projects light of a predetermined pattern to a spot where the snow-removal work is performed; and
   a control unit having a CPU, the control unit detects a deformation of the predetermined pattern, and performs traveling speed control of the machine body and driving control of the auger based upon the deformation of the predetermined pattern,
   wherein the control unit performs control to increase a rotational frequency of the auger and decrease the travel speed of the machine body when the control unit determines that either a snow wall or a snow lump is in the spot where the predetermined pattern is projected in accordance with the deformation of the predetermined pattern while the machine body is traveling and the auger is rotationally driven at a predetermined rotational frequency.

2. The vehicle according to claim 1, further comprising:
a raising and lowering mechanism that raises and lowers the auger,
wherein the control unit controls the raising and lowering mechanism in accordance with the deformation of the predetermined pattern.

3. The vehicle according to claim 2,
wherein when the predetermined pattern deforms in accordance with a transition border of a downward slope in the spot,
the control unit lowers the auger by the raising and lowering mechanism, and
when the predetermined pattern deforms in accordance with a transition border of an upward slope in the spot,
the control unit raises the auger by the raising and lowering mechanism.

4. The vehicle according to claim 1, further comprising:
a rolling mechanism that rolls the auger,
wherein the control unit controls the rolling mechanism in accordance with the deformation of the predetermined pattern.

5. The vehicle according to claim 4,
wherein when the predetermined pattern deforms in accordance with a lateral inclination of the spot,
the control unit rolls the auger such that a rolling state of the auger matches an inclination of the lateral inclination.

6. The vehicle according to claim 1,
wherein when the predetermined pattern deforms in accordance with a level difference or a transition border of a downward slope in the spot,
the control unit decreases the travel speed to a low speed.

7. The vehicle according to claim 1,
wherein a light of the predetermined pattern is a visible light.

8. The vehicle according to claim 1,
wherein the predetermined pattern is grid-shaped.

* * * * *